United States Patent

Kumura et al.

[11] Patent Number: 6,132,891
[45] Date of Patent: Oct. 17, 2000

[54] AMORPHOUS SOFT MAGNETIC MATERIAL

[75] Inventors: Tatsuo Kumura; Yukari Utsumi; Hideaki Karamon, all of Miyagi, Japan

[73] Assignee: Sony Corporation, Tokyo, Japan

[21] Appl. No.: 07/854,626

[22] PCT Filed: Oct. 25, 1991

[86] PCT No.: PCT/JP91/01458

§ 371 Date: Jul. 6, 1992

§ 102(e) Date: Jul. 6, 1992

[87] PCT Pub. No.: WO92/09091

PCT Pub. Date: May 29, 1992

[30] Foreign Application Priority Data

Nov. 8, 1990 [JP] Japan ..................... 2-301176

[51] Int. Cl.$^7$ ..................................... G11B 5/66
[52] U.S. Cl. .................. 428/692; 428/606; 428/611; 428/694 T; 428/900; 420/435; 360/125; 148/304; 148/311; 148/403
[58] Field of Search .................. 428/606, 611, 428/900, 692, 694 T; 148/304, 403, 311; 420/435; 360/125

[56] References Cited

U.S. PATENT DOCUMENTS

| 4,747,888 | 5/1988 | Takino et al. ................ 148/304 |
| 4,766,039 | 8/1988 | Otomo et al. ................ 428/469 |

FOREIGN PATENT DOCUMENTS

| 0 122 792 | 10/1984 | European Pat. Off. . |
| 0 192 161 | 8/1986 | European Pat. Off. . |
| 303324 | 2/1989 | European Pat. Off. . |
| 56-69360 | 6/1981 | Japan . |
| 56-84439 | 7/1981 | Japan . |

OTHER PUBLICATIONS

Abstract of Japanese Published Application 61 188 908 (Aug. 22, 1986), *Patent Abstracts of Japan*, vol. 011017, Group E471, Jan. 17, 1987.

Abstract of Japanese Published Application 2070042 (Mar. 8, 1990) *Patent Abstracts of Japan*, vol. 014254, Group C0724, May 31, 1990.

*Primary Examiner*—Leszek Kiliman
*Attorney, Agent, or Firm*—Hill & Simpson

[57] ABSTRACT

There is disclosed an amorphous soft magnetic material represented by a composition formula:

$Co_x Zr_y Pd_z M_a$ wherein M denotes at least one element selected from a group consisting of niobium, chromium, vanadium, tantalum, tungsten, molybdenum; and $0.82 \leq x \leq 0.94$
$0.04 \leq y \leq 0.10$
$0.01 \leq z \leq 0.08$
$0.01 \leq a \leq 0.10$.

The amorphous soft magnetic material, which has a high saturated magnetic flux density, a low coercive force, a high magnetic permeability and excellent wear and corrosion resistances, can be obtained by adding at least one or more of the elements of the Va and VIa groups to a Co—Zr—Pd amorphous soft magnetic material.

2 Claims, No Drawings

AMORPHOUS SOFT MAGNETIC MATERIAL

TECHNICAL FIELD

The present invention relates to an amorphous soft magnetic material and in particular to an amorphous soft magnetic material having corrosion and wear resistances.

BACKGROUND OF THE INVENTION

Efforts have been made to provide high density and high quality recording signals in a recording/playback apparatus such as audio tape recorder or VTR (video tape recorder). So-called metal tape including powders of a ferromagnetic metal such as iron as magnetic powders and so-called vacuum deposited tape on which a ferromagnetic metal material is directly deposited upon a base film by a vacuum thin film forming technique have been practically used.

In order to perform an excellent recording/reproducing by making effective use of the characteristics of the above mentioned magnetic recording medium having a high coercive force, the core material of a magnetic head should possess a high saturated magnetic flux density. The core material should also possess a high permeability particularly if reproducing is performed by the same magnetic head.

Since recording/reproducing is performed by a magnetic head while a gap portion of a core is in contact with the magnetic recording medium, the gap portion has to be constantly in contact with the magnetic recording medium in a good manner. Accordingly, it is essential that such a core material has wear and corrosion resistances as well as the above mentioned magnetic characteristics so that the gap portion will not change its shape due to wear occurring by the running of the magnetic recording medium thereon.

Therefore, development of an amorphous soft magnetic material having these soft magnetic characteristics has heretofore been made. Those amorphous soft magnetic materials do not have a crystal magnetic anisotropy and have various excellent characteristics such as high permeability and are thus remarkably suitable for the core material of the magnetic head.

A Co—Zr amorphous soft magnetic material among the amorphous magnetic materials has attracted attention since it has a high saturated magnetic flux density. However, a third additive is generally added for adjustment of the magnetostriction since this amorphous soft magnetic materials has a comparatively high magnetostriction constant. Various amorphous soft magnetic material in which the Co—Zr magnetic material is added with a third additive have been proposed.

A Co—Zr—Pd amorphous soft magnetic material in which the Co—Zr magnetic material is added with Pd is disclosed in Japanese Unexamined Patent Publication Sho 61-188908. This amorphous soft magnetic material has a high saturated magnetic flux density, a low magnetostriction constant and also has excellent characteristics for the core material of the magnetic head.

However, this Co—Zr—Pd amorphous soft magnetic material has low wear and corrosion resistances. A magnetic core including such a magnetic material is gradually worn at the gap portion on recording and/or reproducing so that it will be incapable of sufficiently applying a magnetic field upon a magnetic recording medium and is incapable of achieving excellent recording and/or recording for a long period of time. Use of this magnetic material for the magnetic head causes a problem in wear resistance.

Therefore, the present invention was made in view of these circumstances of the prior art. It is an object of the present invention to provide an amorphous soft magnetic material which has a high saturated magnetic flux density and a low magnetostriction constant and which is excellent in wear and corrosion resistances.

SUMMARY OF THE INVENTION

In order to accomplish the above mentioned object, an amorphous soft magnetic material characterized in that said material is represented by a composition formula:

$Co_x Zr_y Pd_z M_a$ wherein M denotes at least one of niobium, chromium, vanadium, tantalum, tungsten, molybdenum; and $0.82 \leq x \leq 0.94$ $0.04 \leq y \leq 0.10$ $0.01 \leq z \leq 0.08$ $0.01 \leq a \leq 0.10$.

The amorphous soft magnetic material of the present invention includes a Co—Zr—Pd amorphous alloy which is added with at least one or more of the elements of the Va and VIa groups, in particular, Nb, Cr, V, Ta, W and Mo.

The contents of Co and Zr, and further the elements of the Va and VIa groups are important in the above mentioned amorphous soft magnetic material. If the contents of these elements are excessively high or low, it is difficult to obtain high saturated magnetic flux density, permeability, corrosion and wear resistances.

If the content of Zr is less than 4 atomic % by atom, there is the high possibility of crystallization. Accordingly, there is the high possibility that an amorphous soft magnetic material cannot be obtained. If the content of the Co is excessively low, lowering of the saturated magnetic flux density can be found and it may be lower than that of the Fe—Al—Si soft magnetic material (Sendust). In order to obtain the (11000 Gausses or higher), it is necessary that the content of Co be 82 atomic % and higher.

On the other hand, addition of the element of the Va or VIa group will enhance the corrosion and wear resistances. It is preferable that the amount of addition be 1 atomic % and higher to obtain enough corrosion and wear resistances. As the content of the element of the Va or VIa group is increased, the wear and corrosion resistances are improved. However, if the content of the element of the Va or VIa group is excessively increased, the saturated magnetic flux density is lowered. If the content exceeds 10 atom %, it may be lowered than the saturated magnetic flux density of the sendust.

Therefore, it is preferable that the contents of Co, Zr, the elements of the Va and VIa groups and Pd be 82 to 94, 4 to 10, 1 to 10 and the remainder respectively in the practical range.

It may be considered that a process for preparing the above mentioned amorphous soft magnetic material includes a liquid quenching process or a sputtering process. Particularly, if the above mentioned amorphous soft magnetic thin film is used for a perpendicularly recording mono-pole head or a narrow gap ring head, etc., a very thin film is required. Accordingly, adoption of the sputtering process is advantageous. The sputtering process is preferable in that it is easy to make a material amorphous and a thin or thick film having a thickness from several hundreds A to several tens of $\mu m$ can be manufactured and the resultant film is excellent in bonding ability.

The sputtering process may be any ordinary methods such as diode, triode or quadode sputtering method, magnetron sputtering method, radio frequency sputtering method, bias sputtering method, and asymmetric a.c. sputtering method.

The amount of each of components of Co, Zr, elements of Pd and the Va and VIa groups which form the amorphous soft magnetic thin film is adjusted by any of the following methods.

(1) Co, Zr and Pd and at least one of the elements of the Va and VIa groups are measured so that they are at a given ratio. They are mixed with each other and melted in, for example, a radio frequency melting furnace to prepare an ingot of alloy. This ingot is used as an target.

(2) Co targets made of single element of Co are prepared. A piece of Zr, Pd or at least one of the elements of the Va and VIa groups is placed upon each of the Co targets. The composition is controlled by adjusting the number of these targets.

(3) Targets, each made of a single element are prepared. The sputtering rate is controlled by adjusting the voltage applied upon each target for controlling the composition.

In accordance with the present invention, an improvement in wear and corrosion resistance of the amorphous soft magnetic material while maintaining the high saturated magnetic flux density, high coercive force and high permeability can be achieved by addition of at least one of the elements of the Va and VIa groups into a Co—Zr—Pd amorphous soft magnetic material.

Since at least one or more of the elements of the Va and VIa groups are added to a Co—Zr—Pd amorphous soft magnetic material, in the present invention, an amorphous soft magnetic material having excellent wear and corrosion resistances as well as high saturated magnetic flux density, low coercive force and high permeability can be obtained. Accordingly, if such an amorphous soft magnetic material is used as a material forming a narrow gap ring head and the like, a gap portion is hardly worn by the running of a magnetic recording medium. The head can be in contact with the magnetic recording medium in a good manner so that excellent recording and reproducing can be constantly performed for a long period of time.

BEST MODES FOR EMBODYING THE INVENTION

Examples of the present invention will be described.

A piece of Zr, Pd or at least one of the elements of the Va and VIa groups was placed on each of the Co targets. An amorphous soft magnetic thin film was prepared on a ceramics substrate by a sputtering process while adjusting the number of the Co targets.

Compositions and the results of measurements of the magnetic characteristics and the wear and corrosion resistances of the amorphous soft magnetic thin films which were prepared in such a manner are shown in Table 1. Numerals denote compositions in atomic %.

The prepared amorphous soft magnetic thin films were in the form of a rectangular strip having the dimensions 2.8 mm×25 mm and a film thickness of about 5 $\mu$m. The compositions of the amorphous soft magnetic thin films denote those of targets.

The magnetic characteristics were measured in a longitudinal direction of the rectangular strip after the prepared amorphous soft magnetic thin films were treated in a rotating magnetic field at 350° C. for 30 minutes and a magnetic field of 4 KOe was applied upon the thin films in a width direction of the strips at 200° C. for 30 minutes. The treatment in the rotating magnetic field was performed at 4 KOe and 100 r.p.m.

The Vicker's hardness was measured by using a hardness tester (trade name MVP-G6 manufactured by AKASHI Co., Ltd.) for an amorphous soft magnetic tin film having a film thickness of 5 to 6 $\mu$m which was formed on a Fotoceram by the sputtering process.

The corrosion resistance was measured by visibly evaluating the corrosion with eye after amorphous soft magnetic thin films were immersed in water for 24 hours. The corrosion of the film which exhibited little change; a slight change in color; slight etch pits; etch pits and change in color; and remarkable corrosion are represented as 5,4,3,2 and 1, respectively.

As comparative examples, measurement of magnetic characteristics and corrosion resistance was performed for a sendust (composition $Fe_{83}Al_6Si_{11}$ wherein numerals denotes the composition at % by weight). The results are shown in Table 1 together with those of the Examples.

Measurement of the magnetic characteristics of the sendust was conducted after the sendust has been anneal-treated in vacuum at 550° C. for one hour. As shown in Table 1, an amorphous soft magnetic material in which a Co—Zr—Pd amorphous soft magnetic material is added with at least one of the elements of Va and VIa groups exhibits very excellent soft magnetic characteristics in which the saturated magnetic flux density, coercive force and permeability are not lower than 11000 Gausses, not higher than 0.05 Oe and not lower than 3000, respectively. It has been proved that these magnetic characteristics are not deteriorated by addition of the elements of the Va and/or Va groups. It has also been proved that the Vicker's hardness and the corrosion resistance are better than those of an amorphous soft magnetic material to which the Va and/or VIa group elements are not added and that the wear and corrosion resistances are improved by the addition of the Va and/or VIa group elements. It has been proved that excellent wear and corrosion resistances are obtained particularly in an amorphous soft magnetic material in which Mo and Nb are added as the Va and VIa group elements.

TABLE 1

| | Magnetic characteristics | | | Vicker's hardness | corrosion resistance |
|---|---|---|---|---|---|
| | saturated magnetic flux density(KG) | corecive force (Oe) | permeability 1MHz | | |
| $Co_{89}Zr_7Pd_4$ | 14.7 | 0.019 | 3100 | 648 | 2 |
| $Co_{87}Zr_7Pd_4Nb_2$ | 14.6 | 0.019 | 3200 | 682 | 3 |
| $Co_{85}Zr_7Pd_4Nb_4$ | 14.1 | 0.030 | 3000 | 732 | 5 |
| $Co_{83}Zr_9Pd_4Nb_4$ | 12.6 | 0.044 | 2900 | 793 | 5 |
| $Co_{82}Zr_7Pd_4Nb_7$ | 12.5 | 0.054 | 3400 | 786 | 5 |
| $Co_{87}Zr_7Pd_4Cr_2$ | 14.3 | 0.23 | 2500 | 675 | 5 |
| $Co_{87}Zr_7Pd_4Mo_2$ | 14.0 | 0.016 | 3300 | 686 | 3 |
| $Co_{85}Zr_7Pd_4Mo_4$ | 13.2 | 0.020 | 3100 | 742 | 5 |
| $Co_{83}Zr_7Pd_4Mo_6$ | 11.9 | 0.019 | 4000 | 754 | 5 |
| $Co_{85}Zr_8Pd_4Nb_2Cr_1$ | 13.3 | 0.030 | 3000 | 728 | 4 |
| $Fe_{83}Al_6Si_{11}$ (by weight) | 11.0 | 0.15 | 2200 | — | 5 |

What is claimed is:

1. An amorphous soft magnetic material characterized in that said material is represented by a composition formula:

$Co_xZr_yPd_zM_a$ wherein M denotes at least one element selected from niobium, chromium, vanadium, tantalum, tungsten, and molybdenum; and $0.82 \leq x \leq 0.94$ $0.04 \leq y \leq 0.10$ $0.01 \leq z \leq 0.08$ $0.01 \leq a \leq 0.10$.

2. An amorphous soft magnetic material consisting of a material having a composition formula:

$Co_xZr_yPd_zM_a$, wherein
$0.82 \leq x \leq 0.94$
$0.04 \leq y \leq 0.10$
$0.01 \leq z \leq 0.08$
$0.01 \leq a \leq 0.10.$;
$x+y+z+a=100$, wherein M consists of at least one element selected from a group consisting of niobium, chromium, vanadium, tantalum, tungsten and molybdenum, said material having coercive force less than 0.05 Oe, excellent wear and corrosion resistance and a saturated magnetic flux density $\geq 11000$ gauss.

* * * * *